Patented June 11, 1935

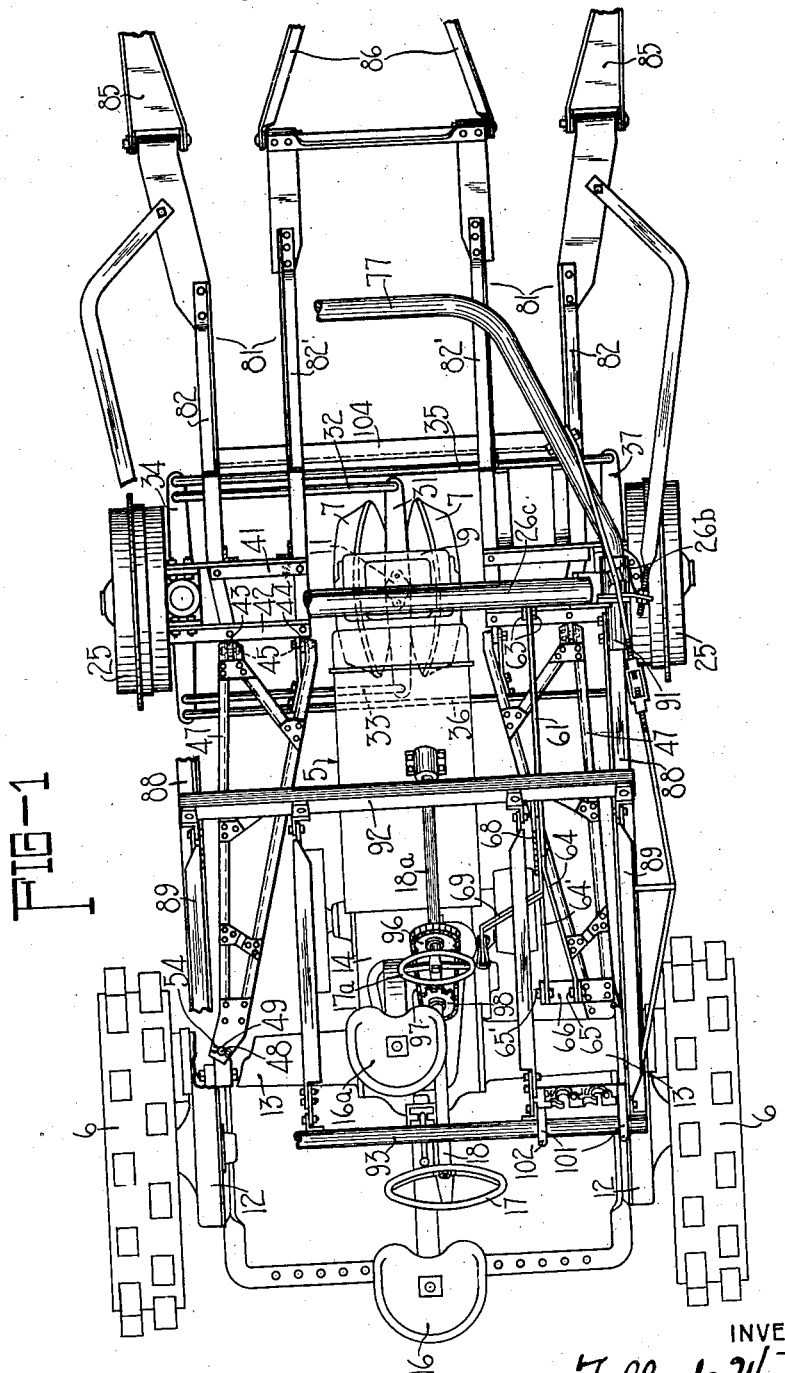

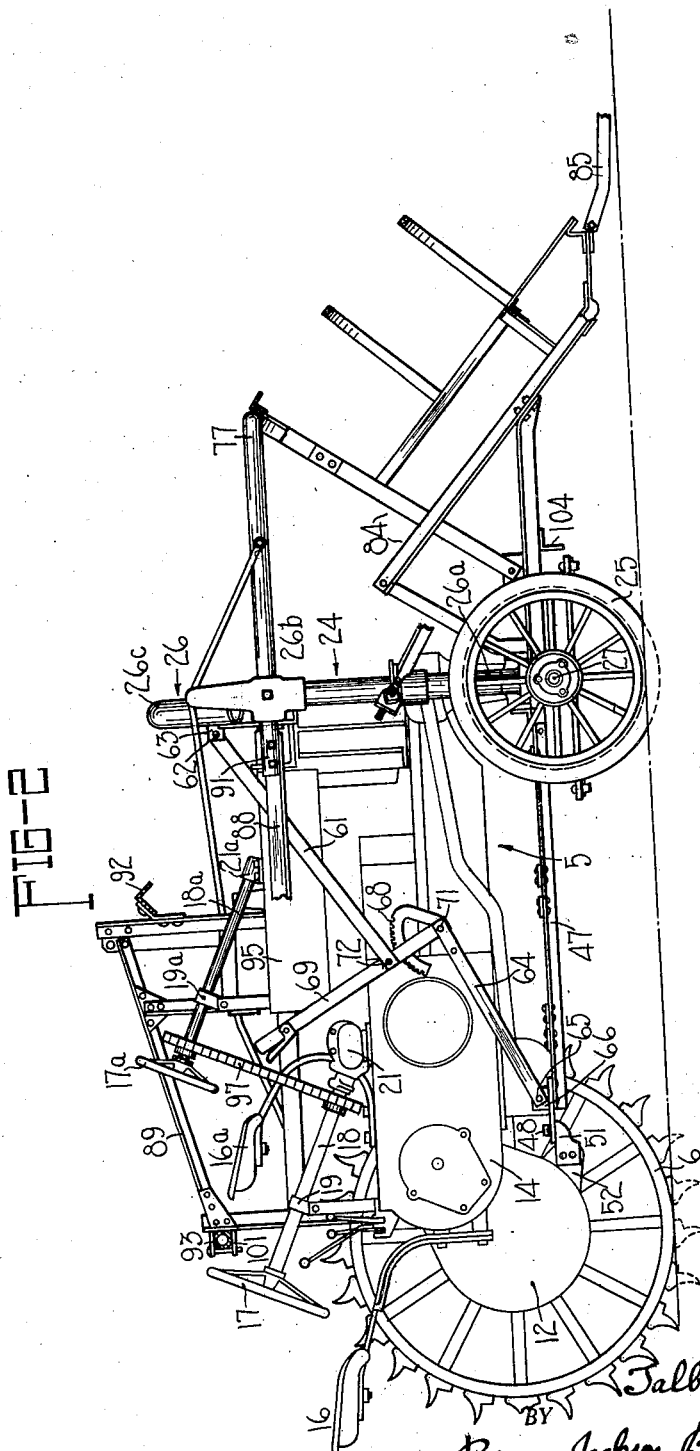

2,004,729

UNITED STATES PATENT OFFICE 2,004,729

TRACTOR PROPELLED IMPLEMENT

Talbert W. Paul, Kansas City, Kans., assignor to Deere & Company, Moline, Ill., a corporation of Illinois Application January 21, 1933, Serial No. 652,784
Renewed October 15, 1934

29 Claims. (Cl. 56—10)

The present invention relates to agricultural implements of the wheel supported, tractor attachment type, i. e., implements which have more or less direct attachment to the tractor but which are provided with their own wheels for supporting some or all of the weight of the implement. Corn harvesters which have one or more picking mechanisms disposed adjacent to the front end of the tractor and which may include mechanism for husking the picked corn, are typical of implements to which my invention has particular application, although I wish it to be understood that my invention is not specifically limited to corn harvesters.

The general object of the invention is to provide an improved construction of wheel supported implement frame, and an improved manner of associating and connecting this frame with the tractor.

One of the more specific objects is to provide an improved implement frame which substantially embraces the tractor. Such construction affords a very close-coupled assembly of short over-all length, which is particularly desirable in that it requires only a minimum turning space at the ends of the field. Another advantage of such construction is the immediate and direct response in steering. Since the implement frame embraces the tractor, the frame steers sidewise substantially directly with the tractor. This is particularly desirable for following plant rows, as exemplified by a corn harvester.

Another object of the invention is to provide an improved propelling connection between this construction of implement frame and the tractor which will result in the major portion of the weight of the implement being borne on the wheels of the attachment frame, and which will permit said wheels and attachment frame to rise and fall relatively to the tractor in passing over irregular ground.

Another object is to provide an improved connection between the tractor and implement frame together with improved adjusting mechanism, which will enable the frame to be adjustably tilted fore and aft relatively to the tractor, as for raising or lowering implement parts carried by the frame relatively to the ground. Preferably, this tilting motion occurs about the implement wheels.

Another object is to provide improved steering mechanism which causes the implement wheels to be steered concurrently with the steering wheel or wheels of the tractor. One of the features of this improved steering mechanism is that it may be utilized to hold the implement frame in proper laterally spaced relationship with respect to the tractor.

Another object is to provide an improved arrangement of auxiliary tractor seat and auxiliary steering control mechanism, whereby the operator can guide the tractor from a more advantageous position affording a better view of the plant rows or work when propelling the implement attachment.

Other objects and advantages of the invention will appear from the following description of one preferred embodiment thereof. In the accompanying drawings illustrating such embodiment:—

Figure 1 is a fragmentary plan view of the attachment frame and tractor, portions of the attachment frame being broken away for convenience of illustration, and the tractor being illustrated in light lines, and Figure 2 is a fragmentary side view with portions broken away, the near driving wheel of the tractor being omitted from the view for better illustrating parts of the attachment frame.

The tractor 5 may be of any conventional type, but is preferably of the three-wheeled or so-called tricycle type, comprising two relatively widespread rear traction wheels 6 and two adjacent steering wheels 7. From Figure 1 it will be seen that the two steering wheels 7 are placed close together to function in effect as one wheel, both swiveling around a common axis defined by a central steering column extending down between the wheels through a wheel supporting casting 9. This steering column has connection with a short transverse axle 11 on which the wheels 7 are journaled. The stub axles of the rear traction wheels 6 are journaled in chain housings 12 in which are enclosed sprocket chains trained over sprocket gears on said stub axles and over sprocket pinions mounted on countershafts extending out through tubular housings 13. The latter housings are secured to the sides of a main central housing 14 in which are enclosed the selective speed transmission mechanism, differential, etc. A conventional draw-bar is indicated at 15, being preferably secured to the chain housings 12. The conventional tractor seat on which the operator ordinarily sits is indicated at 16, and the conventional tractor steering control wheel is indicated at 17. The latter is mounted on a shaft 18 journaled in a rear bearing bracket 19 and in a housing 21, which housing encloses gears transmitting steering motion through the drag link, etc. to the front steering truck.

In describing the implement attachment frame, wherever corresponding parts are duplicated on both sides of the machine, I shall use the same reference numeral to designate these parts. The main frame structure is designated 24 in its entirety, and the major portion of the weight of this frame and of the implement parts mounted thereon, is carried by the two side implement wheels 25. The frame comprises an upwardly extending arch structure 26, which is disposed substantially in the transverse plane of the two implement wheels 25 and which is arched over the top of the tractor 5. The implement wheels are journaled on the horizontal spindle portions of L-shaped axles 27. The upwardly extending arms of these L-shaped axles are journaled for swiveling in sleeves 26a constituting the lower extensions of the arched frame member 26. The upper ends of the substantially vertical side leg portions are provided with bracket fixtures 26b. The transverse portion of the arch consists of a bowed pipe member 26c which arches across the top of the tractor and has its ends rigidly bolted or otherwise secured to the bracket fixtures 26b. The other secondary elements of the frame structure, and the manner of establishing the propelling connection between the tractor and frame, will be later described after considering the steering connections between the tractor steering truck and the implement wheels 25.

Referring to Figure 1, the implement wheels 25 are preferably disposed with their axes substantially in the transverse axial plane of the tractor steering truck 7—7 but if desired the implement wheels may be disposed forwardly or rearwardly thereof. A steering arm or yoke 31 is fixedly secured to the under side of the axle 11 of the tractor steering truck, with the ends of said arm or yoke projecting forwardly and rearwardly beyond the tractor wheels 7. The ends of said arm have front and rear links 32 and 33 pivotally connected therewith, which links extend to one or both of the implement wheels 25, in the preferred construction being illustrated as both extending to the lefthand wheel 25. Here these links are pivotally connected with the front and rear ends of a double-ended steering arm 34 which is fixedly secured to the under side of the L-shaped axle 27 of this wheel. A second pair of front and rear links 35 and 36 are pivotally connected to the outer ends of said arm 34, and extend over to the righthand wheel. Here they are pivotally connected with the front and rear ends of another double-ended steering arm 37, the intermediate portion of which is fixedly attached to the L-shaped axle 27 of this righthand wheel. The outer parallelogram of links and levers 34, 35, 36 and 37 serves the two-fold purpose of transmitting joint steering motion between the two implement wheels, and of serving as a lower brace means for resisting any tendency of the wheels 25 and lower ends of the arched frame member to spread outwardly under the loads imposed on the implement frame. The inner parallelogram of links and levers 31, 32, 33 and 34 also serves the two-fold purpose of transmitting steering motion from the tractor steering truck to the implement wheels, and of serving as a spacing means for maintaining a predetermined lateral relationship of the implement frame with respect to the tractor. The outer parallelogram also cooperates in this spacing function. Any tendency of the implement frame to be deflected or shifted sidewise relatively to the tractor is resisted by the inner links 32, 33, and the outer links also aid in resisting such deflection.

Referring to Figure 1, the frame structure comprises at each side thereof two short bars 41 and 42 which are bolted to the front and rear sides of the lower sleeve portion 26a of the arch member, said bars extending inwardly therefrom toward the tractor. Outer and inner pivot lugs 43 and 44 project rearwardly from the rear bar 42 at each side of the frame. Bolts 45 passing through these lugs establish a substantially horizontal pivot axis for pivotally attaching the frame to a propelling connection, generally indicated at 47. The propelling connections at opposite sides of the implement frame each consist of a frame or link structure extending rearwardly from the transverse horizontal pivot axis 45 to a substantially vertical pivotal axis 48 mounted on the tractor. Said substantially vertical pivot members 48 are preferably in the form of studs projecting upwardly from brackets 51 which are secured to lugs 52 projecting forwardly from the lower portions of the chain housings 12. Each propelling frame 47 has an aperture 49 therein adapted to slip down over the adjacent stud 48, these apertures preferably being sufficiently larger than the studs 48 to permit of a certain amount of vertical or rocking movement of the connecting frames 47 relatively to the studs 48. Suitable cotter pins 54 or like fastening means are provided to prevent the accidental displacement of the propelling frames up over the upper ends of the studs 48.

The mechanism for adjustably tilting the implement frame relatively to the tractor is operatively connected between said frame and one of the propelling frames 47. Referring to Figure 2, this tilting mechanism comprises an upper link 61 which is pivotally connected at 62 between spaced lugs 63 projecting from the arched frame member; and comprises a lower link 64 which is pivotally connected at 65 to a bracket 66 secured to the adjacent propelling frame 47. As shown in Figure 1, the lower link 64 comprises an additional reenforcing bar 64', the two bars diverging rearwardly, and the inner bar 64' being mounted on a pivot pin 65' which is carried by the inner end of the bracket 66 in laterally spaced relation to the outer pin 65 but coaxial therewith. This construction holds the lower link against lateral deflection. The inner bar 64' is formed with an arcuate latching sector 68 at its upper end. An adjusting lever 69 is pivotally supported at 71 between the outer and inner bars 64, 64', and carries a suitable latching detent for cooperating with the quadrant 68. The upper link 61 is pivotally connected to said lever at 72. It will be evident that rocking the adjusting lever 69 forwardly increases the effective length of the composite link mechanism 61, 64 and thereby tilts the projecting front end of the implement downwardly and forwardly; and that rocking said lever rearwardly shortens the effective length of the link mechanism 61, 64 and tilts the projecting front end of the implement frame backwardly and upwardly. The tilting motion in either direction occurs partly about the wheels 25 and partly about the transverse pivot axes 45 connecting the front ends of the propelling frames with the implement frame.

The implement frame 24 also comprises a substantially horizontal arch 77 which extends around the front end of the tractor and which has the ends of its side legs suitably secured in sleeve sockets provided in the bracket fixtures 26b. Where the implement frame is to support the operating parts of a corn harvester, the main frame may support auxiliary or sub-frames 81 arranged between the sides of the tractor and the vertical legs of the U-shaped arch 26. These auxiliary frames can support the downwardly and forwardly inclined picking mechanisms, one at each side of the frame, corresponding to a two-row corn harvester. Said auxiliary frames are shown as comprising pairs of substantially horizontal, forwardly extending bars 82 and 82' which have their rear ends fastened to the above described short transverse bars 41 and 42. Attached to the forward portions of the longitudinal bars 82, 82', and to the front portion of the horizontal arch 77, are inclined frame structures, designated 84 in their entireties, on which the picking mechanisms are mounted. The gatherer points 85, 86 are pivotally connected to the forward portions of these inclined frame structures 84. In the corn harvester embodiment, the main frame 24 may also include rearwardly extending frame members 88 which carry auxiliary frames 89 at their rear ends, adapted to support the husking mechanisms of the implement. The front ends of the longitudinal bars 88 are secured to the arched frame member 26 in any suitable manner, such as by bolting these bars to pipe extensions 81 seated in sockets in the bracket fixtures 26b. These auxiliary rear frames 89 are of any suitable construction for supporting husking boxes and are cross-connected at their front and rear ends by a transverse angle bar 92 rigidly connected to the front portions of said auxiliary frames, and by a transverse pipe 93, preferably detachably connected to the rear portions of said auxiliary frames. It will be observed from Figure 1 that the frame parts 26, 77, 81, 88 and 89 define a frame structure of horizontal U-shape, with the open end of the U facing rearwardly. In attaching the implement frame to the tractor, the front portion of the tractor is driven forwardly into this U-shaped frame structure. The transverse rear pipe 93 is positioned sufficiently high to clear the top of the tractor and to clear the conventional steering wheel column 18, so that it is not necessary to remove this pipe 93 when the tractor is only provided with its conventional steering control. Said pipe preferably has detachable connection, however, with the rear portions of the auxiliary frames 89 so that said pipe can be readily removed during the coupling and uncoupling of the tractor and implement frame when the tractor is provided with its auxiliary steering control mechanism.

This auxiliary steering control mechanism comprises an auxiliary steering wheel 17a which is mounted on an auxiliary steering column 18a. The latter is supported in an elevated position on the top of the tractor, being journaled in front and rear bearings 19a and 21a which may be secured to the top of the fuel tank 95 or on any other top structure of the tractor. A sprocket wheel 96 is secured to the upper column 18a and drives a chain 97 passing down and around a sprocket wheel 98 on the lower, conventional steering column 18. Thus, rotation of the upper attachment wheel 17a is operative to steer the tractor through the same steering instrumentalities as are actuated by the conventional steering wheel 17. An auxiliary tractor seat 16a is also mounted in elevated position, as by being attached to the top of the transmission case 14. This elevated control position may be utilized to obtain a better view of the plant rows or work for accurate guiding of the implement. The implement tilting lever 69 remains accessible to the operator in either of these two driving positions. As shown in Figure 1, said lever is preferably formed with an inwardly and upwardly bent offset to clear the adjacent auxiliary frame 89. When the tractor, equipped with the auxiliary steering control mechanism 17a, 18a is driven into assembling position within the implement frame, it is necessary to remove the transverse rear pipe 93, the same being restored to operative position after the tractor is in place.

The detachability of said pipe may be provided for by mounting the pipe in U-shaped brackets 101 projecting rearwardly from the auxiliary frames 89, the pipe being releasably held in said brackets by pins or bolts 102 passing down through the arms of said brackets in rear of the pipe. In connecting and disconnecting the tractor and implement frame, the rear steering links 33 and 36 are disconnected or swung to the side so as to permit the steering truck wheels 7 to move into or out of position between the implement wheels 25. A transverse protecting bar 104 has its ends secured to the bars 82, 82' of the front auxiliary frames, this protecting bar being disposed in advance of the front steering links 32, 35 and substantially in the horizontal plane thereof, to prevent the possibility of obstructions striking these steering links.

It will be evident that the hinged connections established from the implement frame to the tractor through the propelling frames 47 permit the implement frame and its supporting wheels 25 to rise and fall relatively to the tractor in passing over uneven ground. The lost motion or play afforded by the loose fit of the holes 49 over the studs 48 also permits one side of the implement frame to rise or drop down relatively to the other side and to the tractor, in encountering irregular ground. The rising and falling movement of the implement frame, relatively to the tractor, does not cause any fore and aft tilting of the frame by reason of the the fact that the adjusting link mechanism 61, 64 is connected at its rear end to the adjacent propelling frame 47, whereby said adjusting mechanism moves largely as a unit with the frame in such rising and falling movement. The implement frame is approximately balanced over its supporting wheels 25. Thus, the fore and aft tilting of the frame, as for raising or lowering the implement parts, can be more easily accomplished through the adjusting lever 69. The transverse steering links 32, 33, 35, and 36 maintain the implement frame in predetermined spaced relation with respect to the front end of the tractor, without the necessity of any other spacing means, and these links permit the aforesaid rising and falling movement of the implement frame relatively to the tractor.

In the exemplary embodiment illustrated, the auxiliary frame parts are designed and arranged for supporting the operating mechanisms of a corn harvester, but it will be understood that other arrangements of auxiliary frame parts may be employed for supporting the operating parts of other types of implements. In the copending application of Wilbur J. Coultas and Norman F. Andrews, Serial No. 651,886, filed January 13, 1933, there is disclosed an improved construction of corn harvester, and the arrangement of the picking mechanisms, conveyors, husking mechanisms, elevator, and the driving connections for these several parts, illustrated in detail in that application, may be followed, if desired, in providing the present implement frame with corn harvester mechanism. In such embodiment, the different parts of the corn harvester mechanism are preferably so arranged on the frame as to be substantially balanced over the wheels 25.

While I have illustrated and described what I regard to be the preferred embodiment of my invention, nevertheless it will be understood that such is merely exemplary and that numerous modifications and rearrangements may be made without departing from the essence of the invention.

I claim:—

1. The combination with a tractor comprising rear traction wheels and a relatively narrow front steering truck, of an agricultural implement frame embracing said tractor, dirigible supporting wheels for said frame, steering means for causing said implement wheels to be steered simultaneously with said front steering truck of the tractor, and means connecting said frame with said tractor permitting said frame and its supporting wheels to rise and fall relatively to said tractor.

2. The combination with a tractor comprising rear traction wheels and a relatively narrow front steering truck, of an agricultural implement frame embracing said tractor, dirigible supporting wheels for said frame, steering means for causing said implement wheels to be steered simultaneously with said front steering truck, and pushing members at each side of the body of the tractor and pivotally connected with said implement frame at their front ends and with the tractor at their rear ends.

3. The combination with a tractor comprising rear traction wheels and a relatively narrow front steering truck, of an agricultural implement frame embracing said tractor, dirigible supporting wheels for said frame, steering means for causing said supporting wheels to be steered simultaneously with said front steering truck, a propelling connection between said tractor and frame permitting said frame to tilt fore and aft relatively to said tractor about said supporting wheels, and adjusting mechanism for tilting said frame in either direction to raise or lower one end of said frame.

4. The combination with a tractor comprising rear traction wheels and a relatively narrow front steering truck, of an agricultural implement frame embracing said tractor, dirigible supporting wheels for said frame, steering means for causing said supporting wheels to be steered simultaneously with said front steering truck, means connecting said frame with said tractor permitting said frame to tilt fore and aft relatively to said tractor about said supporting wheels, and adjusting mechanism operatively connected between said implement frame and said connecting means for tilting said frame in either direction to raise or lower the front end thereof.

5. The combination with a tractor comprising rear traction wheels and a relatively narrow front steering truck, of an agricultural implement embracing said tractor, supporting wheels for said implement, said implement being substantially balanced over said supporting wheels, and means connecting said implement with said tractor permitting said implement and its supporting wheels to rise and fall relatively to said tractor.

6. The combination with a tractor comprising rear traction wheels and a relatively narrow front steering truck, of an agricultural implement frame embracing said tractor, dirigible supporting wheels for said frame, and means serving to transmit steering motion from said front steering truck to said supporting wheels and serving to hold said implement frame in spaced relationship with respect to said tractor.

7. The combination with a tractor comprising rear traction wheels and a relatively narrow front steering truck, of an agricultural implement frame embracing said tractor, dirigible supporting wheels for said frame, means connecting said frame with said tractor permitting said frame and its supporting wheels to rise and fall relatively to said tractor, adjusting mechanism for tilting said frame in either direction, and means serving to transmit steering motion from said front steering truck to said dirigible supporting wheels and serving to hold said implement frame in spaced relationship with respect to the tractor.

8. The combination with a tractor comprising rear traction wheels and a relatively narrow front steering truck, of an agricultural implement frame embracing said tractor, a dirigible supporting wheel for said frame, and means serving to transmit steering motion from said front steering truck to said dirigible wheel and serving to maintain said implement frame in spaced relationship with respect to the tractor.

9. The combination with a tractor comprising rear traction wheels and front steering wheels, of an agricultural implement frame associated with said tractor, a dirigible supporting wheel for said frame, and means serving to transmit steering motion from said front steering wheels to said dirigible supporting wheel and serving to hold said implement frame in substantially predetermined spaced relationship with respect to the tractor.

10. The combination with a tractor comprising rear traction wheels and front steering wheels, of an agricultural implement frame embracing said tractor, dirigible supporting wheels for said frame, steering means for causing said supporting wheels to be steered simultaneously with said front steering wheels, and means connecting said frame with said tractor permitting said frame and its supporting wheels to rise and fall relatively to said tractor.

11. The combination with a tractor comprising a steering wheel, of an agricultural implement frame, a dirigible supporting wheel for said frame disposed in proximity to the transverse axial plane of said tractor steering wheel, steering means for causing said dirigible supporting wheel to be steered simultaneously with said tractor steering wheel, and means connecting said frame with said tractor permitting said frame and its dirigible supporting wheel to rise and fall relatively to said tractor.

12. The combination with a tractor, of an agricultural implement frame embracing said tractor and comprising an upwardly extending arch member extending over the top of the tractor, supporting wheels for said frame disposed in proximity to the front steering wheel or wheels of the tractor, and a propelling connection between said tractor and frame permitting relative vertical movement therebetween.

13. The combination with a tractor, of an agricultural implement frame embracing said tractor, supporting wheels for said frame, a propelling connection between said tractor and frame permitting said frame to be tilted fore and aft relatively to said supporting wheels, and adjusting mechanism operatively connected between said frame and said propelling connection for tilting said frame in either direction.

14. The combination with a tractor, of an agricultural implement frame associated with said tractor, supporting wheels for said frame, a propelling connection between said tractor and frame permitting said frame and its supporting wheels to rise and fall relatively to said tractor and permitting said frame to tilt fore and aft relatively to said supporting wheels, and adjusting mechanism operatively connected at one end with said propelling connection and operatively connected at its other end with said frame, for tilting said frame fore and aft in either direction.

15. The combination with a tractor comprising a front steering truck, of an agricultural implement frame embracing said tractor, dirigible supporting wheels for said frame spaced outwardly from the sides of said front steering truck, and links operative between said steering truck and said dirigible supporting wheels to transmit steering motion from said truck to said supporting wheels and to maintain said implement frame in substantially predetermined lateral spacing with respect to said tractor.

16. The combination with a tractor having a relatively narrow front steering truck, of an agricultural implement frame associated with said tractor, dirigible supporting wheels for said frame, and mechanism for transmitting steering motion to said supporting wheels and for maintaining predetermined spaced relationship between said implement frame and said tractor, comprising a parallelogram of links and levers operatively connecting said front steering truck with one of said supporting wheels, and a parallelogram of links and levers operatively connecting said latter supporting wheel with its companion supporting wheel.

17. The combination with a tractor having a relatively narrow front steering truck, of an agricultural implement frame embracing said tractor, axles on said frame at opposite sides thereof, dirigible supporting wheels for said frame journaled on said axles, means connecting said frame with said tractor permitting said frame and its supporting wheels to rise and fall relatively to said tractor, an intermediate longitudinally extending bar secured to the front steering truck of said tractor, side longitudinally extending bars secured to said axles, link means operatively connecting said intermediate bar with one of said side bars, and a pair of links operatively connecting said side bars and disposed forwardly and rearwardly of the substantially vertical axis of said front steering truck.

18. In combination, a tractor comprising a ground engaging steering wheel, an implement frame comprising a dirigible supporting wheel, a propelling connection between said tractor and frame, a steering connection between said tractor steering wheel and said dirigible supporting wheel, said tractor comprising a conventional steering control wheel and shaft actuated thereby, adapted to transmit steering motion to said ground engaging steering wheel, an auxiliary steering wheel on said tractor, and means for transmitting motion from said auxiliary steering wheel to said shaft.

19. The combination with a tractor comprising rear traction wheels and a front steering wheel, of an agricultural implement frame, a dirigible supporting wheel for said frame disposed in front and substantially in line with one of said rear traction wheels, steering means for causing said dirigible supporting wheel to be steered simultaneously with said tractor steering wheel, and means connecting said frame with said tractor permitting said frame and its dirigible wheel to rise and fall relative to said tractor.

20. The combination with a tractor, of an agricultural implement frame associated with the tractor, wheel means for supporting the frame, a propelling connection between said tractor and the frame comprising a member pivotally connected at its respective ends with the tractor and with the frame, whereby the frame and its supporting wheel means is free to rise and fall relative to the tractor and the frame is free to tilt fore and aft relative to said wheel means, and adjusting mechanism operatively connected at one end with said propelling means and operatively connected at its other end with said frame for tilting said frame fore and aft in either direction.

21. The combination with a tractor comprising a relatively narrow body supported on a pair of spaced rear traction wheels and a relatively narrow centrally disposed front steering truck, of an agricultural implement frame associated with the tractor including a frame section disposed along one side of the tractor body between the treads of the front steering truck and one of the rear traction wheels, wheel means for supporting the frame, a propelling connection between said tractor and said frame including a member pivotally connected at its respective ends to the tractor and to the frame, whereby the frame is free to rise and fall relative to said tractor and is free to tilt fore and aft relative to said wheel means, and adjusting mechanism for tilting said frame fore and aft in either direction.

22. The combination with a tractor comprising a relatively narrow body supported on a pair of spaced rear traction wheels and a relatively narrow centrally disposed front steering truck, of an agricultural implement frame associated with the tractor and including a frame section disposed along one side of the tractor body between the treads of the front steering truck and one of the rear traction wheels, operating units supported by said frame, wheel means for supporting the frame so disposed with respect to said frame and said units that the implement is substantially balanced thereon, a propelling connection between said tractor and said frame including a member pivotally connected with the tractor and with the frame adjacent the axis of said wheel means, whereby the frame is free to rise and fall relative to said tractor and is free to tilt fore and aft relative to said wheel means, and adjusting mechanism reacting against the tractor for tilting said frame fore and aft in either direction.

23. The combination with a tractor comprising rear traction wheels and a relatively narrow front steering struck, of an agricultural implement frame embracing said tractor, dirigible supporting wheels for said frame, steering means for causing said implement wheels to be steered simultaneously with said front steering truck of the tractor, and means connecting said frame with said tractor to provide for movement of the frame relative to the tractor.

24. The combination with a tractor comprising rear traction wheels and a relatively narrow front steering truck, of an agricultural implement frame embracing said tractor, dirigible supporting wheels for said frame, steering means for causing said supporting wheels to be steered simultaneously with said front steering truck, a propelling connection between said tractor and frame permitting said frame to tilt relatively to said tractor, and adjusting mechanism for tilting said frame in either direction to raise or lower one end of said frame.

25. The combination with a tractor comprising rear traction wheels and a relatively narrow front steering truck, of an agricultural implement embracing said tractor, supporting wheels for said implement, said implement being substantially balanced over said supporting wheels, and means connecting said implement with said tractor permitting said implement and its supporting wheels to have movement relatively to said tractor.

26. The combination with a tractor comprising rear traction wheels and front steering wheels, of an agricultural implement frame embracing said tractor, dirigible supporting wheels for said frame, steering means for causing said supporting wheels to be steered simultaneously with said front steering wheels, and means connecting said frame and its supporting wheels with said tractor to provide for generally vertical movement thereof relatively to said tractor.

27. The combination with a tractor having rear traction wheels, of a rigid generally U-shaped frame having its central portion embracing the front of the tractor and end portions extending along the sides of the tractor, a pair of operating units carried on said frame, one at each side of the tractor, and means connecting said frame with the tractor for movement relative thereto.

28. The combination with a tractor comprising rear traction wheels and a relatively narrow front steering truck, of an agricultural implement frame embracing said tractor, dirigible supporting wheels disposed in fore and aft alignment with said rear traction wheels and serving to support at least a portion of the weight of said frame, and means connecting both said wheels and said frame with the tractor for movement relative thereto.

29. The combination with a tractor having front dirigible and rear traction wheels, of a rigid generally U-shaped frame having its central portion embracing the front of the tractor and end portions extending along the sides of the tractor, a pair of operating units carried on said frame, one at each side of the tractor, dirigible wheels for said frame disposed in fore and aft alignment with said rear traction wheels and serving to support at least a portion of the weight of said frame, means interconnecting the dirigible wheels of said frame and the dirigible wheels of the tractor, and means connecting both the frame and its dirigible wheels with said tractor for movement relative thereto in a generally vertical direction.

TALBERT W. PAUL.